(12) United States Patent
Schrader et al.

(10) Patent No.: US 7,717,242 B2
(45) Date of Patent: May 18, 2010

(54) TORSIONAL VIBRATION DAMPER DISK

(75) Inventors: Scott Schrader, Canton, OH (US);
Steven Olsen, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 1017 days.

(21) Appl. No.: 11/446,741

(22) Filed: Jun. 5, 2006

(65) Prior Publication Data
US 2006/0279030 A1      Dec. 14, 2006

Related U.S. Application Data

(60) Provisional application No. 60/689,457, filed on Jun. 10, 2005.

(51) Int. Cl.
*F16F 7/10* (2006.01)
(52) U.S. Cl. .................. 188/378; 464/68.1; 192/213
(58) Field of Classification Search ............... 267/164; 188/378–380; 464/66.1, 68.1; 74/440; 192/3.29, 192/3.3, 85 AA, 212, 213
See application file for complete search history.

(56) References Cited

U.S. PATENT DOCUMENTS

| | | | | |
|---|---|---|---|---|
| 4,304,107 A * | 12/1981 | Fall et al. .................. | 464/64.1 |
| 4,441,315 A * | 4/1984 | Bochot ........................ | 60/345 |
| 4,545,468 A * | 10/1985 | Caray ....................... | 192/214.1 |
| 4,785,924 A * | 11/1988 | Jackel ........................ | 192/3.29 |
| 5,377,796 A * | 1/1995 | Friedmann et al. ......... | 192/3.29 |
| 5,975,261 A * | 11/1999 | Woerner et al. ............ | 192/3.29 |
| 6,264,564 B1 * | 7/2001 | Fukushima et al. ........ | 464/68.3 |
| 6,354,413 B2 * | 3/2002 | Heller et al. ............... | 192/3.29 |
| 7,244,184 B2 * | 7/2007 | Fukushima ............... | 464/68.41 |
| 2004/0206201 A1 * | 10/2004 | Tsuruta et al. ................ | 74/574 |
| 2006/0016661 A1 * | 1/2006 | George et al. ........... | 192/85 AA |
| 2007/0048082 A1 * | 3/2007 | Hoffmann et al. ......... | 403/359.1 |

* cited by examiner

*Primary Examiner*—Pam Rodriguez
(74) *Attorney, Agent, or Firm*—Simpson & Simpson, PLLC

(57) ABSTRACT

A torsional vibration damping disk with a base body which has a circumferential edge on the outside which is partially turned back in order to form receiver spaces for spring elements, in particular for bow spring elements. In order to create a torsional vibration damping disk which has a long service life at high rotational rates, a reinforcement strap, the free end of which is fastened to the base body, extends out from the circumferential edge in the area of at least one receiver space.

16 Claims, 1 Drawing Sheet

TORSIONAL VIBRATION DAMPER DISK

CROSS REFERENCE TO RELATED APPLICATIONS

This patent application claims the benefit under 35 U.S.C. §119(e) of U.S. Provisional Application No. 60/689,457, filed Jun. 10, 2005, which application is incorporated herein by reference.

FIELD OF THE INVENTION

The invention concerns a torsional vibration damper disk with a base body which has a circumferential edge on the outside which is partially turned back in order to form receiver spaces for spring elements, in particular for bow spring elements.

BACKGROUND OF THE INVENTION

The task of the invention is to create a torsional vibration damper disk with a base body which has a circumferential edge on the outside which is partially turned back in order to form receiver spaces for spring elements, in particular for bow spring elements, which even with high rotational speeds have a long service life.

SUMMARY OF THE INVENTION

The task is solved in a torsional vibration damper disk with a base body which has a circumferential edge on the outside which is partially turned back in order to form receiver spaces for spring elements, in particular for bow spring elements, in that in the area of at least one receiver space, a reinforcement strap extends from the circumferential edge, the free end of which is fastened to the base body. Preferably the base body of the torsional vibration damper disk has the form of an annular disk and is formed from stamped and deformed sheet metal. The circumferential edge which is turned back has, in cross section, essentially the form of a C which partially encompasses the spring element. Each of the receiver spaces for the spring elements is delimited by two stop zones. Preferably at least one reinforcement strap is provided in the area of each receiver space. The reinforcement strap serves to absorb the stresses which occur in operation of the torsional vibration damper disk at high rotational speeds. By this means the stability of the torsional vibration damper disk is increased in the area of the receiver spaces for the spring elements.

A preferred exemplary embodiment of the torsional vibration damper disk is characterized in that the reinforcement strap in cross section has the form of an arc which extends from the circumferential edge to the base body of the torsional vibration disk. Preferably the interior diameter of the arc is matched to the exterior diameter of the spring elements.

A further preferred exemplary embodiment of the torsional vibration damper disk is characterized in that extending radially inward from the arc is a fastening section which lies flat against the base body. Preferably the fastening section essentially has the form of a rectangular plate.

Another preferred exemplary embodiment of the torsional vibration damper disk is characterized in that the fastening section is joined to the base body by means of a firm bond. Preferably the fastening section is welded to the base body.

Another preferred exemplary embodiment of the torsional vibration damper disk is characterized in that the fastening section is fastened to the base body with the aid of a fastening element. The fastening element can, for example, be a screw or a rivet.

Another preferred exemplary embodiment of the torsional vibration damper disk is characterized in that the fastening section has a through hole that is arranged congruently with another through hole which is provided in the base body. The two through holes preferably serve to pass a fastening element through.

Another preferred exemplary embodiment of the torsional vibration damper disk is characterized in that the partially turned back circumferential edge of the torsional vibration damper disk has a cut-out in the area of the reinforcement strap. The cut-out facilitates access to the reinforcement strap from the inside. As a result, the introduction of a processing tool, for example a forming punch, during manufacture is facilitated.

Another preferred exemplary embodiment of the torsional vibration damper disk is characterized in that the cut-out is arranged diametrically across from the reinforcement strap. By this means the deforming of the reinforcement strap with the aid of a processing tool, for example, a forming punch, is facilitated The invention relates in particular to a hydrodynamic torque converter with a torsional vibration damper disk described above.

Further advantages, features and details of the invention are found in the following description in which an exemplary embodiment is described in detail with reference to the drawing, whereby the features mentioned in the claims and in the description can be essential to the invention individually or in any desired combination.

BRIEF DESCRIPTION OF THE DRAWING

In the accompanying FIG. 1, a torsional vibration damping disk according to the invention is presented in perspective.

DETAILED DESCRIPTION OF THE INVENTION

Figure 1:
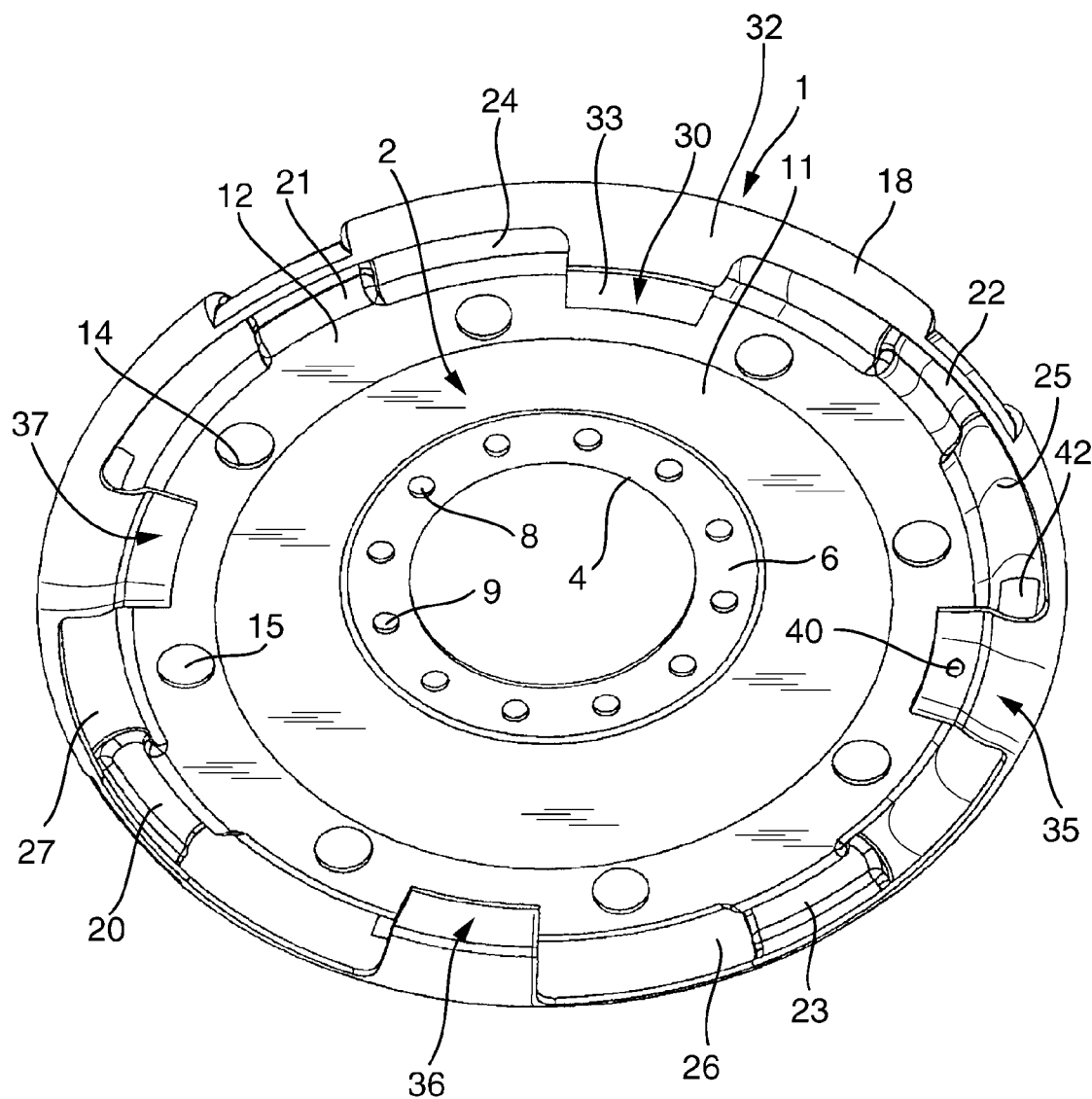

The torsional vibration damper disk is a part of a hydrodynamic torque converter that is arranged in the drive train of a motor vehicle between an internal combustion engine and an automatic transmission. The internal combustion engine has a drive shaft, for example a crankshaft, which is joined so to be torque-proof to a housing wall of the torque converter close to the power plant. The torque converter has a housing with a housing wall close to the power plant and a housing wall away from the power plant.

The housing wall of the torque converter away from the power plant is combined with a pump wheel into one component. Between the pump wheel and the housing wall close to the power plant, a turbine wheel is arranged which is joined with a transmission input shaft so as to be torque-proof. Between the turbine wheel and the pump wheel, a stator can be arranged which is borne via a free wheel on a stator hub which in turn is placed via a toothed wheel work upon a tube section attached to the housing.

Between the turbine wheel and the housing wall close to the power plant is arranged a piston of the converter bridge clutch. Radially inwardly, the piston has a collar directed away from the transmission which is borne on the turbine hub so as to be capable of being axially slid and which is sealed off from such hub by a gasket. In the direction of the internal combustion engine, which is also designated power plant, the piston has a friction surface which is arranged across from a friction surface which is provided on the side of the housing close to the power plant on the side facing away from the internal combustion engine. Between the friction surfaces is arranged an intermediate layer which is joined to the piston so as to be torsion-proof.

The piston at the same time forms the input portion of a torsional vibration damper which is interposed between the piston and the turbine wheel. The torsional vibration damper has several receiver spaces for energy storage elements. An arm angled off outwardly from the piston toward the transmission locks into each of the energy storage elements. The receiver spaces are configured in a torsional vibration disk which is fastened radially inwardly to a turbine wheel hub with the aid of riveted joints which in turn is fastened to the turbine wheel.

In the accompanying FIGURE, such a torsional vibration disk 1 is depicted in perspective. Torsional vibration damper disk 1 essentially has the form of an annular disk 2 which possesses a central through hole 4. Central through hole 4 borders a fastening flange 6 which is provided with several through holes 8, 9. Through holes 8, 9 serve the passage of fastening means such as screws, with the aid of which torsional vibration damper disk 1 can be fastened to a turbine wheel hub (not depicted).

Radially outside of fastening flange 6, torsional vibration damping disk 1 has two annular-disk-shaped sections 11, 12 which are arranged concentrically to central through hole 4. Outer annular-disk-shaped section 11 has several through holes 14, 15 which serve assembly purposes.

Radially outwardly, torsional vibration damper disk 1 has a turned back edge 18 which extends from the annular-disk-shaped section 12 and has a C-shaped cross section. Turned back edge 18 is interrupted by the distorted zones 20 through 23 which form stops in the circumferential direction for (not depicted) bow springs. A receiver space 24 through 27 for a bow spring is delimited between each two adjacent deformed zones 20 through 23.

In the middle between deformed zones 21 and 22, a reinforcing strap 30 extends in the area of receiver area 24 from turned back edge 18. Reinforcing strap 30 comprises a connecting section 32 which extends from the outer end of turned back edge 18 to annular-disk-shaped section 12. Connecting section 32, viewed in cross section, has the same curvature as turned back edge 18. This results in a closed annular-shaped cross section for receiving space 24 in the area of reinforcing strap 30. At the end of connecting section 32, a fastening section 33 is angled off. Fastening section 33 essentially has the shape of a rectangular plate which is welded or bonded to annular-disk-shaped section 12. Fastening flange 6 and annular-disk-shaped sections 11, 12 together form a base body of torsional vibration damping disk 1 from which turned back edge 18 extends.

A reinforcement strap 35 through 37 is allocated to each of receiver zones 25 through 27 which is configured precisely as reinforcement strap 30. The only difference between the reinforcing straps is that the fastening section of reinforcement strap 35 has a through hole 40 which is arranged congruently with a through hole which is provided in annular-disk-shaped section 12 of torsional vibration disk 1. The two through holes serve the passing through of a screw connecting element or of a riveted connecting element, with the aid of which the fastening section of reinforcement strap 35 is fastened to annular-disk-shaped section 12. In addition, turned back edge 18 has a cut-out 42 across from reinforcement strap 35 which facilitates the introduction of a processing tool such as a forming punch.

REFERENCE NUMERALS

1 torsional vibration damper disk
2 annular disk
4 central through hole
6 fastening flange
8 through hole
9 through hole
11 annular-ring-shaped section
12 annular-ring-shaped section
14 through hole
15 through hole
18 turned back edge
20 deformed area
21 deformed area
22 deformed area
23 deformed area
24 receiver space
25 receiver space
26 receiver space
27 receiver space
30 reinforcement strap
32 connecting section
33 fastening section
35 reinforcement strap
36 reinforcement strap
37 reinforcement strap
40 through hole
42 cut-out

What is claimed is:

1. A torsional vibration damping disk comprising a base body (6, 11, 12) which has a circumferential edge (18) on the outside which is turned back in places toward a center of the base body, in order to form receiver spaces (24-27) for receiving spring elements, wherein a reinforcement strap (30, 35-37), operatively arranged to hold the spring elements in the receiver spaces, extends from the circumferential edge (18) in the area of at least one receiver space (24-27), wherein the circumferential edge is formed integrally from the base body, and the reinforcement strap is formed integrally from the circumferential edge, and wherein a free end of the reinforcement strap is fastened to the base body (6, 11, 12).

2. The torsional vibration damping disk according to claim 1 wherein the reinforcement strap (30, 35-37) in cross section has the shape of an arc (32) which extends from the circumferential edge (18) to the base body (6, 11, 12) of the torsional vibration damper (1).

3. The torsional vibration damping disk according to claim 2 wherein a fastening section (33) which lies flat against the base body (6, 11, 12) extends radially from the arc-shaped section (32) toward the interior.

4. The torsional vibration damping disk according to claim 3 wherein the fastening section (33) is joined to the base body (6, 11, 12) by a firm bond.

5. The torsional vibration damping disk according to claim 3 wherein the fastening section (33) is fastened to the base body (6, 11, 12) with the aid of a fastening element.

6. The torsional vibration damping disk according to claim 3 wherein the fastening section (35) has a through hole (40) which is arranged congruently with another through hole which is provided in the base body (6, 11, 12).

7. The torsional vibration damping disk according to claim 3 wherein the partially turned back circumferential edge (18)

of the torsional vibration damping disk (1) has a cut-out (42) in the area of the reinforcement strap (35).

8. The torsional vibration damping disk according to claim 7 characterized in that the cut-out (42) is arranged across from the reinforcement strap (35).

9. A hydrodynamic torque converter with a torsional vibration damping disk (1), said damping disk comprising a base body (6, 11, 12) which has a circumferential edge (18) on the outside which is turned back in places toward a center of the base body, in order to form receiver spaces (24-27) for receiving spring elements, wherein a reinforcement strap (30, 35-37), operatively arranged to hold said spring elements in said receiver spaces, extends from the circumferential edge (18) in the area of at least one receiver space (24-27), wherein the circumferential edge is formed integrally from the base body, and the reinforcement strap is formed integrally from the circumferential edge, and wherein a free end of the reinforcement strap is fastened to the base body (6, 11, 12).

10. The hydrodynamic torque converter according to claim 9 wherein the reinforcement strap (30, 35-37) in cross section has the shape of an arc (32) which extends from the circumferential edge (18) to the base body (6, 11, 12) of the torsional vibration damper (1).

11. The hydrodynamic torque converter according to claim 10 wherein a fastening section (33) which lies flat against the base body (6, 11, 12) extends radially from the arc-shaped section (32) toward the interior.

12. The hydrodynamic torque converter according to claim 11 wherein the fastening section (33) is joined to the base body (6, 11, 12) by a firm bond.

13. The hydrodynamic torque converter according to claim 11 wherein the fastening section (33) is fastened to the base body (6, 11, 12) with the aid of a fastening element.

14. The hydrodynamic torque converter according to claim 11 wherein the fastening section (35) has a through hole (40) which is arranged congruently with another through hole which is provided in the base body (6, 11, 12).

15. The hydrodynamic torque converter according to claim 11 wherein the partially turned back circumferential edge (18) of the torsional vibration damping disk (1) has a cut-out (42) in the area of the reinforcement strap (35).

16. The hydrodynamic torque converter according to claim 15 characterized in that the cut-out (42) is arranged across from the reinforcement strap (35).

\* \* \* \* \*